(12) United States Patent
Kasahara et al.

(10) Patent No.: US 9,378,570 B2
(45) Date of Patent: Jun. 28, 2016

(54) INFORMATION PROCESSING DEVICE, INFORMATION PROCESSING METHOD AND PROGRAM

(71) Applicant: SONY CORPORATION, Minato-ku (JP)

(72) Inventors: Shunichi Kasahara, Kanagawa (JP); Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 14/345,764

(22) PCT Filed: Nov. 13, 2012

(86) PCT No.: PCT/JP2012/007268
§ 371 (c)(1),
(2) Date: Mar. 19, 2014

(87) PCT Pub. No.: WO2013/088637
PCT Pub. Date: Jun. 20, 2013

(65) Prior Publication Data
US 2014/0225914 A1 Aug. 14, 2014

(30) Foreign Application Priority Data
Dec. 14, 2011 (JP) ................................. 2011-273193

(51) Int. Cl.
| | |
|---|---|
| *G06T 11/40* | (2006.01) |
| *G06Q 30/02* | (2012.01) |
| *G06K 9/00* | (2006.01) |
| *G06T 19/00* | (2011.01) |
| *G06Q 10/10* | (2012.01) |
| *G06T 7/00* | (2006.01) |

(52) U.S. Cl.
CPC ............ *G06T 11/40* (2013.01); *G06K 9/00899* (2013.01); *G06Q 10/10* (2013.01); *G06Q 30/02* (2013.01); *G06T 7/004* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2006/0065733 | A1* | 3/2006 | Lee ................... | G06F 17/30879 235/462.01 |
| 2009/0287558 | A1* | 11/2009 | Seth .................. | G06Q 30/0221 705/14.22 |
| 2010/0299530 | A1* | 11/2010 | Bell ....................... | G06F 21/32 713/186 |
| 2010/0325563 | A1* | 12/2010 | Goldthwaite ....... | G06F 3/04815 715/757 |

(Continued)

FOREIGN PATENT DOCUMENTS

| | | |
|---|---|---|
| JP | 2008-047015 A | 2/2008 |
| JP | 2010-238098 A | 10/2010 |

OTHER PUBLICATIONS

Partial International Search Report issued Feb. 28, 2013 in PCT/JP2012/007268.
Anil K. Jain, et al., "Acoustical and Thermal Energy" Encyclopedia of Biometrics, XP007921542, Aug. 27, 2009, p. 99.

(Continued)

*Primary Examiner* — Maurice L McDowell, Jr.
(74) *Attorney, Agent, or Firm* — Oblon, McClelland, Maier & Neustadt, L.L.P

(57) ABSTRACT

An information processing system that acquires image data corresponding to an object; acquires content based on a determination of whether the image data is direct image data that is directly acquired or indirect image data that is indirectly acquired; and outputs the acquired content.

25 Claims, 13 Drawing Sheets

(56) References Cited

U.S. PATENT DOCUMENTS

| | | | |
|---|---|---|---|
| 2011/0004436 A1* | 1/2011 | Beute | G06F 3/017 |
| | | | 702/141 |
| 2011/0007949 A1* | 1/2011 | Hanna | G06K 9/00604 |
| | | | 382/107 |
| 2012/0272287 A1* | 10/2012 | Kuhlke | H04W 4/206 |
| | | | 726/1 |

OTHER PUBLICATIONS

Jean-Francois Mainguet, et al., "Fingerprint Encryption and Fingerprint Fake Detection" Encyclopedia of Biometrics , XP007921546, Aug. 27, 2009, pp. 458-465.

Davide Maltoni, et al., "Fingerprint Reading" Encyclopedia of Biometrics, XP007921547, Aug. 27, 2009, pp. 510-513.

* cited by examiner

Fig. 6

MARKER INFORMATION

| MARKER CODE | PROVISION TIME | PRESENCE POSITION | CONTENT ID FOR PARENT TERMINAL | CONTENT ID FOR CHILD TERMINAL |
|---|---|---|---|---|
| Mark1 | 13:00~14:00 | 139 DEGREES 44 MINUTES EAST LONGITUDE 35 DEGREES 39 MINUTES NORTH LATITUDE | P001 | C001 |

Fig. 10

PARENT-CHILD RELATIONSHIP INFORMATION

| MARKER CODE | PARENT TERMINAL ID | CHILD TERMINAL ID |
|---|---|---|
| Mark1 | T0001 | T0002 |

Fig. 11

CONTENT RESTRICTION INFORMATION

| NUMBER OF CHILD TERMINALS | RESTRICTION IMPOSED ON CONTENT |
|---|---|
| 0 | STRONG |
| 1 | NORMAL |
| 2 OR MORE | WEAK |

INFORMATION PROCESSING DEVICE, INFORMATION PROCESSING METHOD AND PROGRAM

TECHNICAL FIELD

The present disclosure relates to an information processing device, an information processing method and a program.

BACKGROUND ART

In recent years, with the advancement of image recognition technology, a position or a posture of a real object (e.g., an object such as a signboard or a building) contained in an input image from an imaging device can be recognized. An AR (Augmented Reality) application is known as one application example of such object recognition. According to the AR application, a virtual object (e.g., advertisement information, navigation information or information for a game) associated with a real object can be superimposed on a real object contained in a real space image. Such an AR application is disclosed in, for example, Patent Literature 1.

For example, service of providing content based on an object when an advertisement, a poster, digital signage or the like is recognized as the object is also considered as technology using the AR application. According to such technology, when a captured image of the object can be acquired, the object can be recognized from the captured image even in a place away from a place in which the object is present and the content based on the object can be provided. For example, when a terminal device that directly images the object displays a captured image and the other terminal device images the displayed captured image, the object can be recognized even in the other terminal device and content based on the object can be provided to the other terminal device.

CITATION LIST

Patent Literature

PTL 1: JP 2010-238098A

SUMMARY

Technical Problem

However, there are cases in which it is desired to distinguish between the content provided to the terminal device that directly images an object and the content provided to the terminal device that indirectly images the object as in a case in which the captured image of the object is imaged. For example, in a case in which distribution of content is desired to be limited or a case in which the distribution of content is desired to be promoted, there is a demand for control of the content to be provided to the terminal device according to a plan for the distribution of content. Accordingly, it is preferable to realize technology for distinguishing between a terminal device that directly images an object and a terminal device that indirectly images an object.

Solution to Problem

An information processing system comprising: one or more processing units that acquire image data corresponding to an object; acquire content based on a determination of whether the image data is direct image data that is directly acquired or indirect image data that is indirectly acquired; and output the acquired content.

The information processing system may include a first information processing apparatus comprising an image capturing unit that captures the image data corresponding to the object; and a first communication interface that outputs the image data to a second information processing apparatus; and the second information processing apparatus comprising a second communication interface that receives the image data from the first information processing apparatus; and a processing unit that acquires the image data corresponding to the object; acquire content based on a determination of whether the image data is direct image data that is directly acquired or indirect image data that is indirectly acquired; and controls the second communication interface to output the acquired content to the first information processing apparatus. Or the information processing system may be a terminal including the one or more processing units.

An information processing method performed by an information processing system, the method comprising: acquiring, by one or more processing units of the information processing system, image data corresponding to an object; acquiring, by one or more processing units of the information processing system, content based on a determination of whether the image data is direct image data that is directly acquired or indirect image data that is indirectly acquired; and outputting the acquired content.

A non-transitory computer-readable medium including computer program instructions, which when executed by an information processing system, cause the information processing system to perform a process comprising: acquiring image data corresponding to an object; acquiring content based on a determination of whether the image data is direct image data that is directly acquired or indirect image data that is indirectly acquired; and outputting the acquired content.

Advantageous Effects of Invention

As described above, according to the present disclosure, it is possible to distinguish between a terminal device that directly images an object and a terminal device that indirectly images an object.

BRIEF DESCRIPTION OF DRAWINGS

FIG. 6 is a diagram showing a configuration example of marker information.

FIG. 10 is a diagram showing a configuration example of parent-child relationship information.

FIG. 11 is a diagram showing a configuration example of content restriction information.

DESCRIPTION OF EMBODIMENTS

Figure 1:
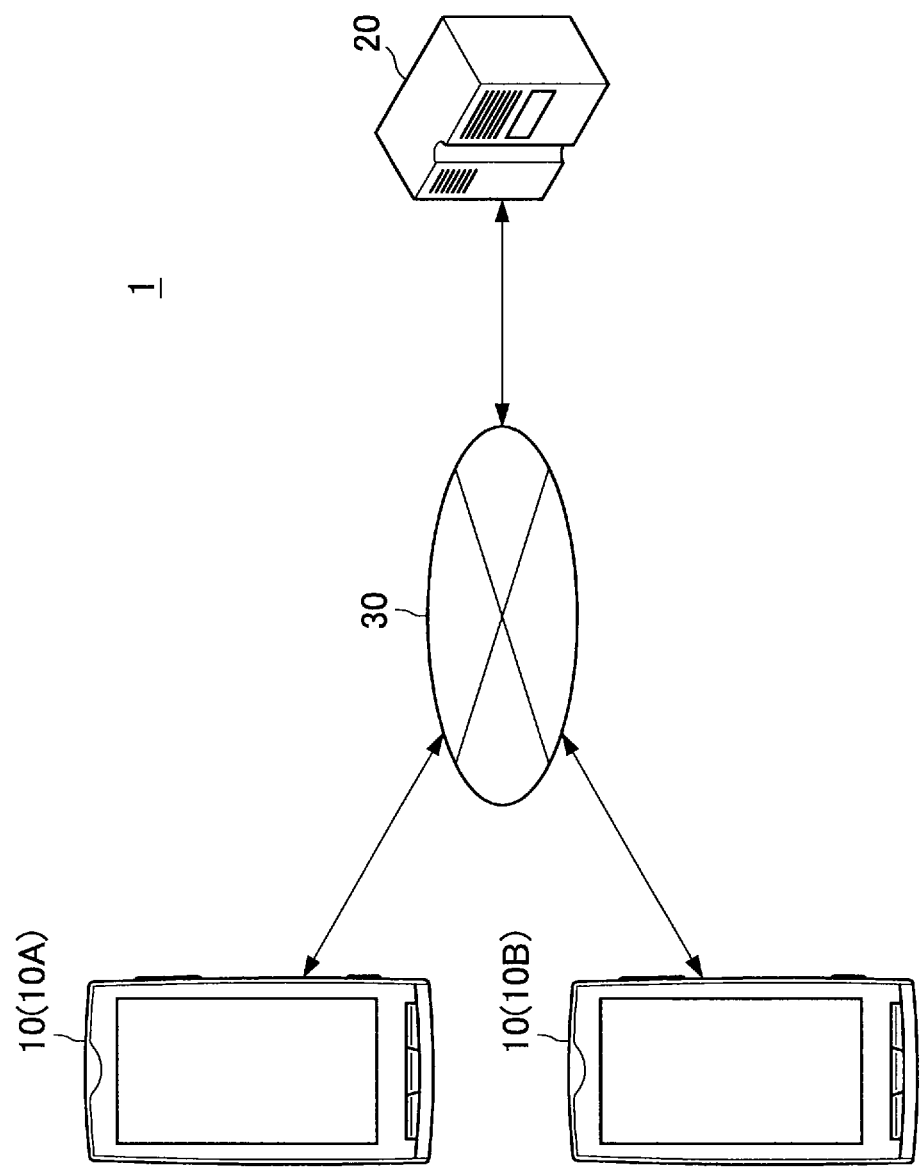
FIG. 1 is an illustrative diagram showing a configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this disclosure and the drawing, a plurality of components having substantially the same functional configuration may be distinguished by assigning different letters after the same reference numerals. However, when it is unnecessary to particularly distinguish between the plurality of components having substantially the same functional configuration, the same reference numerals are assigned to the components.

Further, the "Description of Embodiments" will be described in the following order.
1. Overview of Information Processing System
2. Terminal Device that Directly Images Marker
3. Terminal Device that Indirectly Images Marker
4. Functional Configuration Example of Terminal Device
5. Functional Configuration Example of Information Processing Device
6. Provision of Content to Parent Terminal
7. Provision of Content to Child Terminal
8. Classification Operation in Information Processing Device
9. Content Provision Operation Information Processing Device
10. Conclusion

1. Overview of Information Processing System

Hereinafter, first, an overview of an information processing system according to an embodiment of the present disclosure will be described with reference to FIG. 1.

FIG. 1 is an illustrative diagram showing a configuration of an information processing system according to an embodiment of the present disclosure. As shown in FIG. 1, an information processing system 1 according to an embodiment of the present disclosure includes terminal devices 10 and an information processing device 20. In the example shown in FIG. 1, a terminal device 10A and a terminal device 10B are shown as examples of the terminal devices 10, but the number of terminal devices 10 is not particularly limited. The terminal device 10 directly or indirectly images a marker present in a real space, recognizes a marker code from a captured image, and transmits the marker code to the information processing device 20 via a network 30. Here, a description will continue on the assumption that the terminal device 10A directly images the marker and the terminal device 10B indirectly images the marker. In this disclosure, it is assumed that the term "marker" generally refers to an object present in a real space, which has a known pattern. That is, the marker may include, for example, a real object, a part of a real object, a figure, a symbol, a character string or a picture shown on a surface of a real object, an image displayed on a display, or the like. In a narrow sense, the term "marker" may refer to a particular object prepared for some applications, but the technology according to the present disclosure is not limited to such an example.

The information processing device 20 may receive the marker code from the terminal device 10 via the network 30. Further, when the information processing device 20 receives the marker code from the terminal device 10, the information processing device 20 may send content related to the marker code to the terminal device 10, which is a transmission source, via the network 30. A type of content is not particularly limited and may be, for example, still image content, moving image content, sound data, video and audio data, or text data. Further, while the example in which the single information processing device 20 has a plurality of functions (e.g., a classification function and a content provision function that will be described later) is shown in FIG. 1, different devices may have the plurality of respective functions. As discussed below, the terminal device includes an output unit 130 that is a display module, which may be a part of the terminal device 10 or may be configured as a separate body from the terminal device 10. This output unit 130 may be controlled to display both the marker and the content both independently or together. For example, the output unit 130 may display the marker when the marker is acquired, then switch to displaying the content upon acquisition of the content. Alternatively, the display unit may display the marker when the marker is acquired, then superimpose the content related to the marker on the displayed marker.

Further, smartphones are shown in FIG. 1 as examples of the terminal device 10A and the terminal device 10B. However, the terminal device 10A and terminal device 10B are not limited to smartphones. For example, the terminal device 10A and the terminal device 10B may be PDAs (Personal Digital Assistants), mobile phones, portable music players, portable image processing devices, or portable game devices.

Further, the network 30 is a wired or wireless transmission path for information transmitted from a device connected to the network 30. For example, the network 30 may include a public line network such as the Internet, a telephone line network, or a satellite communication network, a LAN (Local Area Network), or a WAN (Wide Area Network). Further, the network 30 may include a leased line network such as an IP-VPN (Internet Protocol-Virtual Private Network).

Meanwhile, there are cases in which it is desired to distinguish between content provided to the terminal device 10A that directly images a marker and content provided to the terminal device 10B that indirectly images the marker. For example, when distribution of content is desired to be limited or when the distribution of the content is desired to be promoted, there is a demand for control of content provided to the terminal device 10A and the terminal device 10B according to a plan for distribution of content. Accordingly, it is preferable to realize technology for distinguishing between the terminal device 10A and the terminal device 10B.

An embodiment of the present disclosure has been made in view of the circumstances described above. According to an embodiment of the present disclosure, it is possible to distinguish between the terminal device 10A that directly images a marker and the terminal device 10B that indirectly images the marker. Hereinafter, the terminal device 10A that directly images the marker will be described with reference to FIG. 2.

2. Terminal Device that Directly Images Marker

Figure 2:
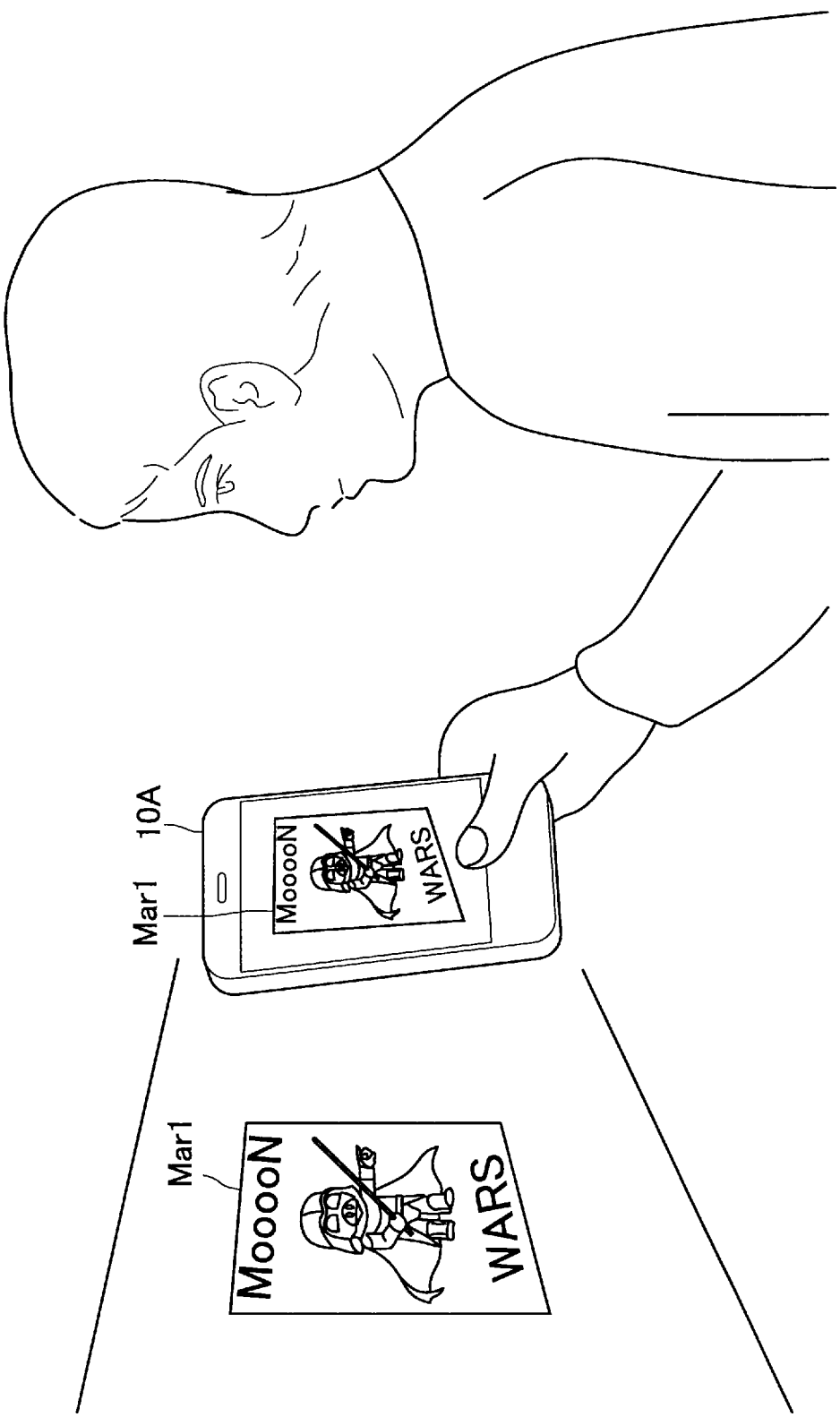
FIG. 2 is a diagram showing a state in which a marker is directly imaged by a terminal device.

FIG. 2 is a diagram showing a state in which a marker is directly imaged by the terminal device 10A. It is assumed that a user is present in a place in which a marker Mar1 present in a real space can be imaged by the terminal device 10A, as shown in FIG. 2. In such a case, the terminal device 10A can directly image the marker Mar1 present in the real space. The terminal device 10A that directly images the marker Mar1 present in the real space may be classified as a parent terminal by the information processing device 20.

Further, a case in which the marker Mar1 is a poster is shown in FIG. 2, but the marker Mar1 may not be the poster as described above. Further, in particular, the marker Mar1 may be a poster for introducing a movie. In this case, content associated with the marker Mar1 (e.g., video and audio data) may be provided from the information processing device 20 to the terminal device 10A.

The terminal device 10A that directly images the marker has been described above with reference to FIG. 2. Hereinafter, the terminal device 10B that indirectly images the marker will be described with reference to FIG. 3.

3. Terminal Device that Indirectly Images Marker

Figure 3:
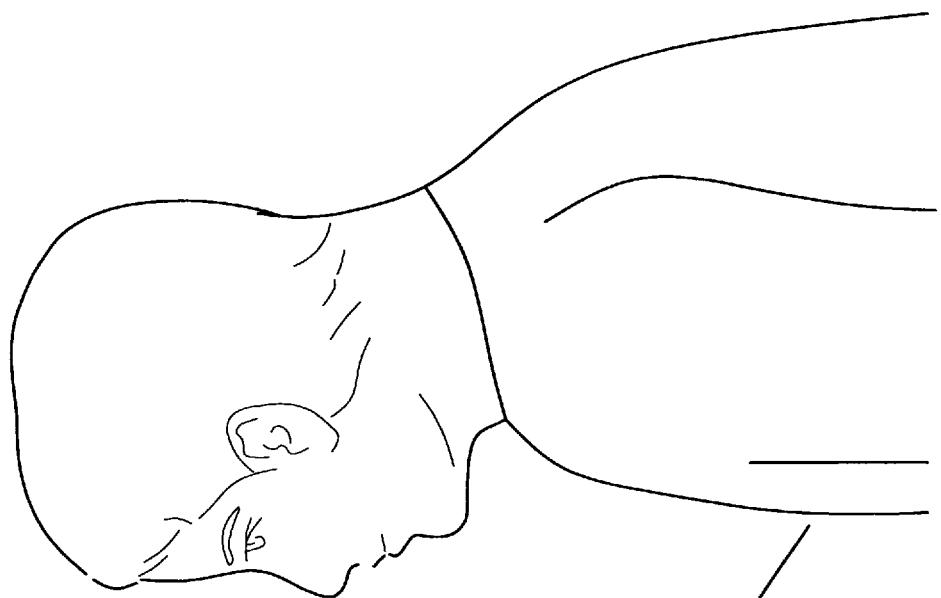
FIG. 3 is a diagram showing a state in which a marker is indirectly imaged by a terminal device.
Figure 3:
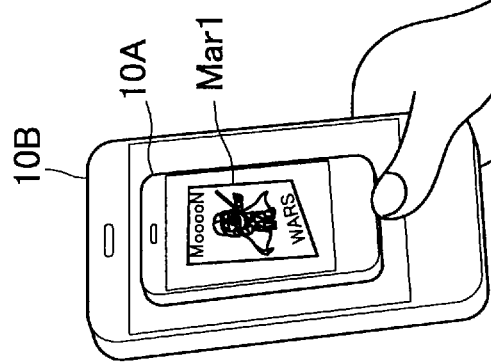
Figure 3:
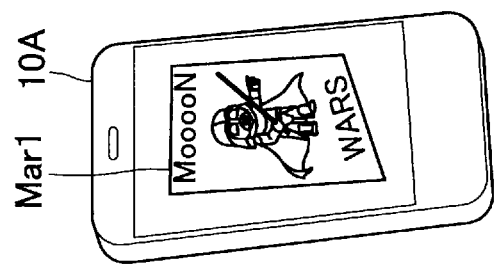

FIG. 3 is a diagram showing a state in which a marker is indirectly imaged by the terminal device 10B. It is assumed that the user can image the marker Mar1 displayed on the terminal device 10A using the terminal device 10B, as shown in FIG. 3. In such a case, the terminal device 10B can indirectly image the marker Mar1 present in the real space. The terminal device 10B that indirectly images the marker Mar1 present in the real space may be classified as a child terminal by the information processing device 20.

Further, the content (e.g., video and audio data) associated with the marker Mar1 may be provided from the information processing device 20 to the terminal device 10B. In this case, content different from the content provided to the terminal device 10A may be provided to the terminal device 10B.

The terminal device 10B that indirectly images the marker has been described above with reference to FIG. 3. Hereinafter, a functional configuration example of the terminal device 10 will be described in detail with reference to FIG. 4.

4. Functional Configuration Example of Terminal Device

Figure 4:
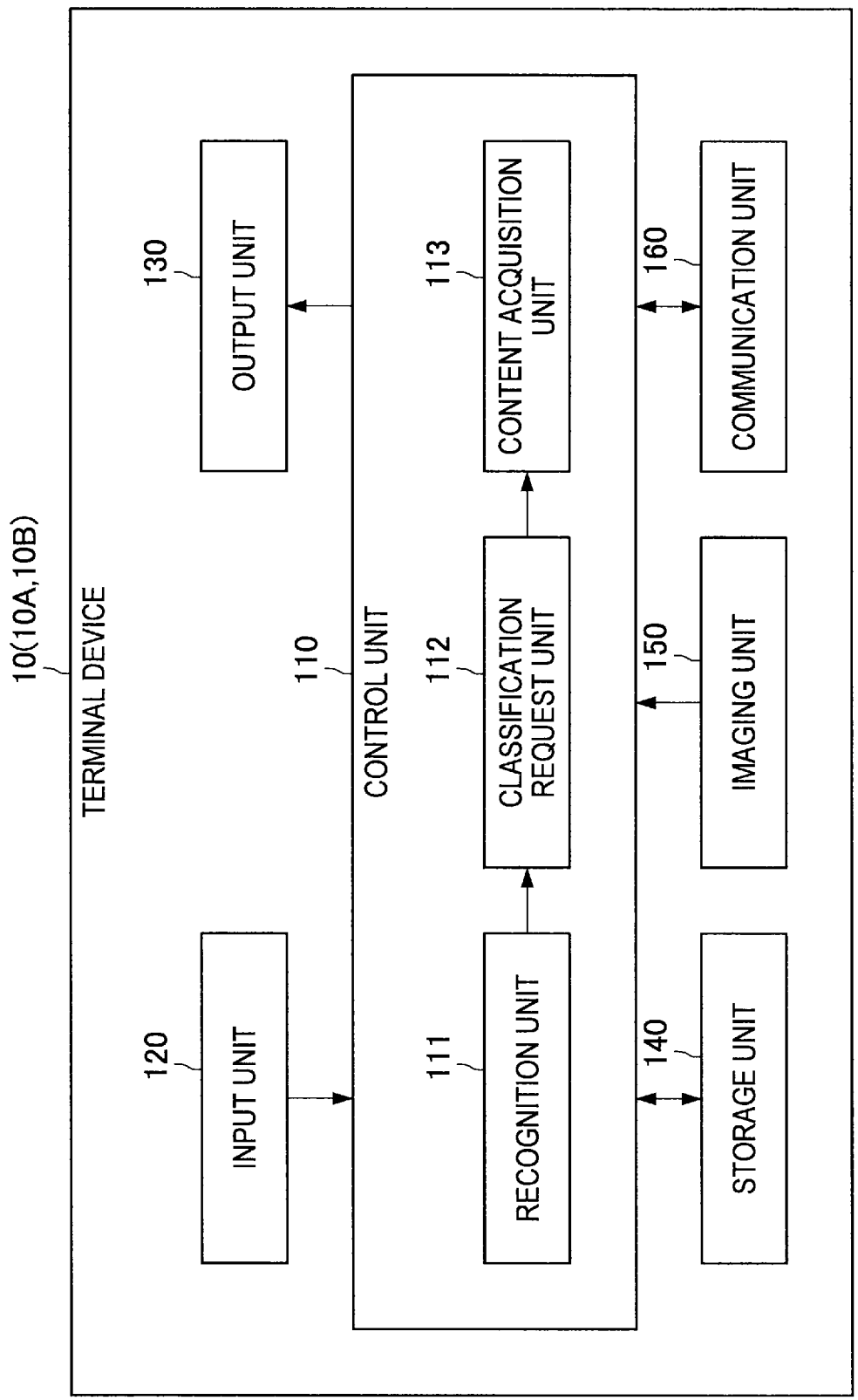
FIG. 4 is a block diagram showing a functional configuration example of a terminal device.

FIG. 4 is a block diagram showing a functional configuration example of the terminal device 10. Referring to FIG. 4, the terminal device 10 includes a control unit 110, an input unit 120, an output unit 130, a storage unit 140, an imaging unit 150 and a communication unit 160. The control unit 110 includes a recognition unit 111, a classification request unit 112, and a content acquisition unit 113.

(Control Unit)

The control unit 110 corresponds to a processor such as a CPU (Central Processing Unit) or a DSP (Digital Signal Processor). The control unit 110 activates various functions of the control unit 110, which will be described later, by executing a program stored in the storage unit 140 or the other storage medium. Further, the control unit 110 may be assembled in the terminal device 10 or may be assembled in the other device (e.g., a server).

(Input Unit)

The input unit 120 is an input device used for a user to manipulate the terminal device 10 or to input information to the terminal device 10. The input unit 120 may include, for example, a keyboard, a keypad, a mouse, a button, a switch or a touch panel. The input unit 120 may include a gesture recognition module that recognizes a gesture of a user.

(Output Unit)

The output unit 130 is a display module configured as an LCD (Liquid Crystal Display), an OLED (Organic Light-Emitting Diode), a CRT (Cathode Ray Tube) or the like. The output unit 130 may be a part of the terminal device 10 or may be configured as a separate body from the terminal device 10.

(Storage Unit)

The storage unit 140 stores a program and data for a process in the terminal device 10 using a storage medium, such as a semiconductor memory or a hard disk. For example, the storage unit 140 stores a feature quantity dictionary used for object recognition. Further, the storage unit 140 stores a recognition result generated as an object recognition result.

(Imaging Unit)

The imaging unit 150 generates a captured image by imaging a real space using an imaging element, such as a CCD (Charge Coupled Device) or a CMOS (Complementary Metal Oxide Semiconductor). In an embodiment of the present disclosure, it is assumed that the imaging unit 150 is a part of the terminal device 10. However, the imaging unit 150 may be configured as a separate body from the terminal device 10.

(Communication Unit)

The communication unit 160 is, for example, a communication interface configured as a communication device for connection to the network 30. Further, the communication unit 160 may be a communication device corresponding to a wireless LAN (Local Area Network), a communication device corresponding to LTE (Long Term Evolution), or a wired communication device that performs wired communication. The communication unit 160 is capable of communication with, for example, the information processing device 20 via the network 30.

The functional configuration of the terminal device 10 has been described with reference to FIG. 4. Hereinafter, a functional configuration of the information processing device 20 according to an embodiment of the present disclosure will be described in detail with reference to FIG. 5.

5. Functional Configuration Example of Information Processing Device

Figure 5:
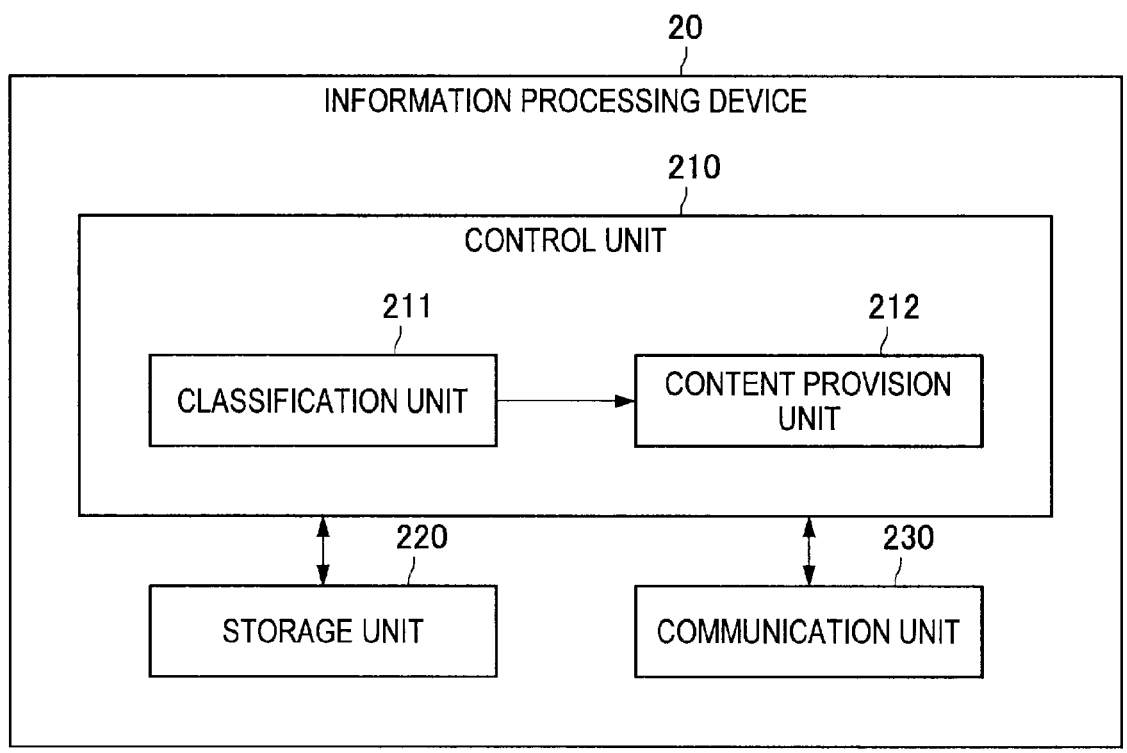
FIG. 5 is a block diagram showing a functional configuration example of an information processing device.

FIG. 5 is a block diagram showing a functional configuration example of the information processing device 20. Referring to FIG. 5, the information processing device 20 includes a control unit 210, a storage unit 220, and a communication unit 230. The control unit 210 includes a classification unit 211 and a content provision unit 212.

(Control Unit)

The control unit 210 corresponds to a processor such as a CPU (Central Processing Unit) or a DSP (Digital Signal Processor). The control unit 210 activates various functions of the control unit 210, which will be described later, by executing a program stored in the storage unit 220 or the other storage medium. Further, the control unit 210 may be assembled in the information processing device 20 or may be assembled in another device.

(Storage Unit)

The storage unit 220 stores a program or data for a process in the information processing device 20 using a storage medium, such as a semiconductor memory or a hard disk. Further, the storage unit 220 stores a program for classifying terminal devices. Further, the storage unit 220 may store a program for providing content to the terminal devices.

(Communication Unit)

The communication unit 230 is, for example, a communication interface configured as a communication device for connection to the network 30. Further, the communication unit 230 may be a communication device corresponding to a wireless LAN (Local Area Network), a communication device corresponding to LTE (Long Term Evolution), or a wired communication device that performs wired communication. The communication unit 230 is capable of communicating with, for example, the terminal device 10 via the network 30.

The functional configuration example of the information processing device 20 has been described above with reference to FIG. 5. Hereinafter, provision of content to a parent terminal will be described in detail with reference to FIGS. 6 and 7.

6. Provision of Content to Parent Terminal

FIG. 6 is a diagram showing a configuration example of marker information. For example, the marker information as shown in FIG. 6 is stored in the storage unit 220 of the information processing device 20 in advance. The marker information, for example, may be registered in the storage unit 220 from the other terminal connected to the network 30 by a content provider. As shown in FIG. 6, the marker information includes, for example, a marker code, a provision time, a presence position, content ID for a parent terminal, and content for a child terminal ID.

The marker code is a code recognized from a marker present in a real space. In the marker information shown in FIG. 6, a marker code Mark1 is set as a marker code recognized from the marker Mar1. The provision time is information indicating a time when the marker is provided to the user, and "13:00~14:00" is set as the provision time in the marker information shown in FIG. 6. For example, when the marker is digital signage, the provision time corresponds to a time when the marker is displayed, and when the marker is a posted paper medium, the provision time corresponds to a time when a marker is posted. Further, since the provision time is provided when the marker provided to the user is changed over time, the provision time may not be provided when the marker is not particularly changed.

The presence position is information indicating a position at which the marker is present, and "139 degrees 44 minutes east longitude and 35 degrees 39 minutes north latitude" is set as the presence position in the marker information shown in FIG. 6. However, a representation format of the presence position is not limited to the format using longitude (an X coordinate) and latitude (a Y coordinate). For example, the representation format of the presence position may be a format using polar coordinates or may be a format using a vector. Further, the representation format of the presence position may be three-dimensional coordinates, including altitude.

The content ID for a parent terminal is information for identifying content provided to the terminal device classified as a parent terminal 10 by the information processing device 20. In the marker information shown in FIG. 6, "P001" is set as the content ID for a parent terminal. Meanwhile, the content ID for a child terminal is information for identifying content provided to the terminal device 10 classified as a child terminal by the information processing device 20. In the marker information shown in FIG. 6, "C001" is set as the content ID for the child terminal. Further, a predetermined threshold may be further associated with the marker code, as will be described later.

Figure 7:
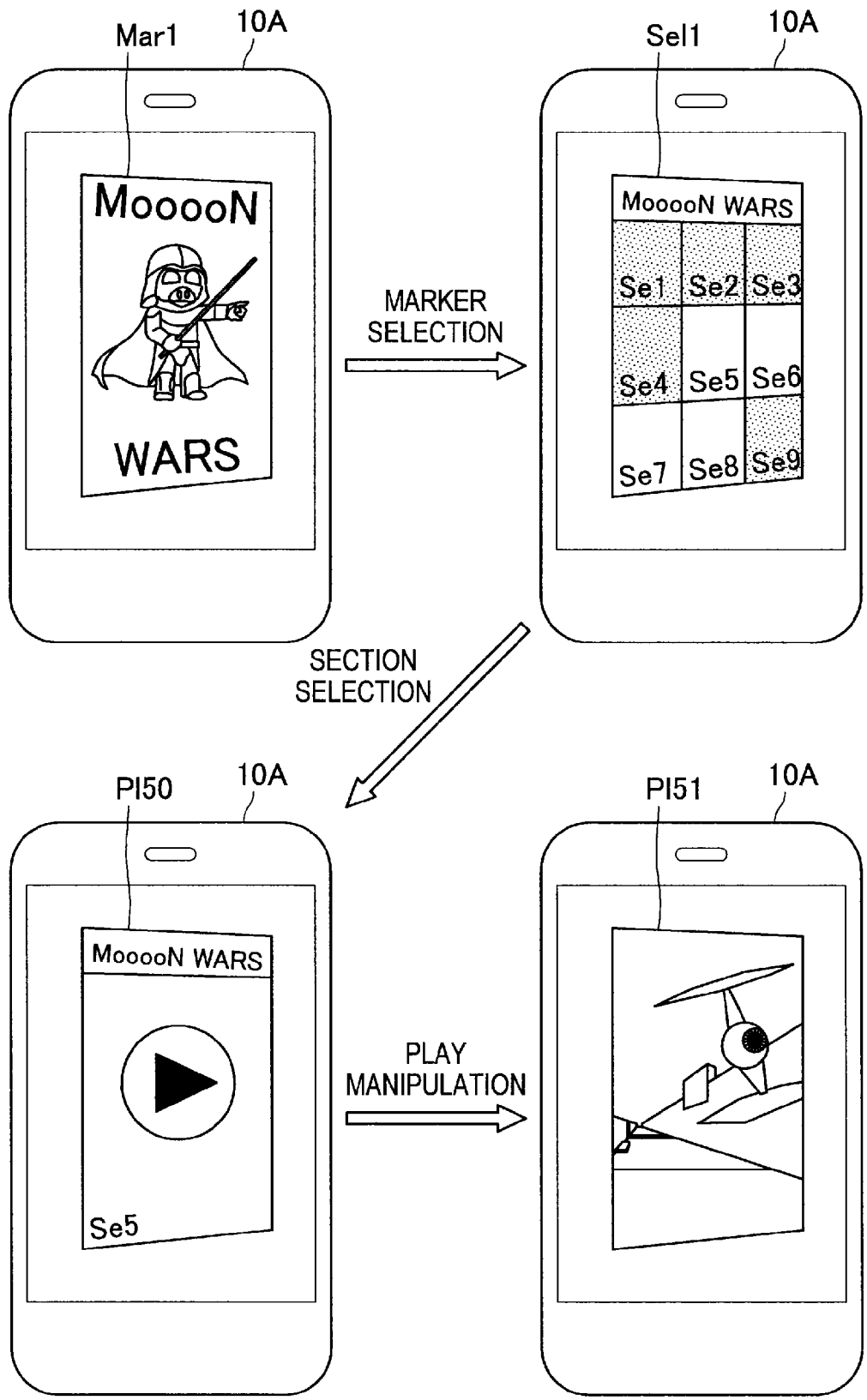
FIG. 7 is a diagram showing a state of provision of content to a parent terminal.

FIG. 7 is a diagram showing a state of provision of content to a parent terminal. A process of classifying the terminal device 10A as a parent terminal and a process in which content is provided to the terminal device 10A classified as the parent terminal will be described with reference to FIG. 7.

First, as shown in FIG. 7, when the imaging unit 150 of the terminal device 10A images the marker Mar1, the recognition unit 111 recognizes a marker code from the marker contained in a captured image. For example, in the example shown in FIG. 2, the imaging unit 150 images the marker Mar1, and the recognition unit 111 recognizes the marker code Mark1 from the marker Mar1 contained in the captured image. Further, the recognition unit 111 may recognize a position and a posture of the marker contained in the captured image.

For example, the recognition unit 111 may recognize the marker contained in the captured image by matching a feature quantity determined from the captured image that is imaged and obtained by the imaging unit 150 against a feature quantity of the marker.

More specifically, the recognition unit 111 determines the feature quantity of the real object in the captured image according to a feature quantity determination method such as an SIFT method or a Random Ferns method, and matches the determined feature quantity against the feature quantity of the real object. Also, the recognition unit 111 recognizes information (marker code) for identifying a marker associated with a feature quantity that best matches the feature quantity of the real object in the captured image, and the position and the posture of the marker in the captured image.

While a feature quantity dictionary in which the feature quantity data of the real object is associated with the information for identifying the real object is used by the recognition unit 111 herein, the feature quantity dictionary may be stored in the storage unit 140 or may be received from a server by the communication unit 160. The feature quantity data of the real object may be, for example, a set of feature quantities determined from a learning image of the real object according to the SIFT method or the Random Ferns method.

While the example in which the recognition unit 111 recognizes the position and the posture of the marker contained in the captured image through image processing has been described above, a scheme of recognizing the position and the posture of the marker is not limited to the recognition scheme based on image processing. For example, the recognition unit 111 detects a direction of the imaging unit 150 and a current position of the terminal device 10, and may estimate the marker included in the captured image and the position and the posture of the marker in the captured image based on the detection result.

The marker code recognized by the recognition unit 111 is controlled by the classification request unit 112 to be transmitted as a classification request to the information processing device 20 via the network 30. For example, a terminal ID for identifying the terminal device 10A, an imaging time indicating a time when the marker is imaged, and an imaging position indicating a position at which the marker is imaged may also be contained in the classification request. A representation format of the imaging position is not particularly limited, similar to the presence position set in the marker information. Further, the classification request unit 112, for example, may control the classification request to be transmitted when a selection manipulation for selecting the marker Mar1 is input to the input unit 120.

The communication unit 160 transmits the classification request via the network 30 to the information processing device 20 under control of the classification request unit 112. The classification request transmitted by the communication unit 160 is received by the communication unit 230 of the information processing device 20 and acquired by the classification unit 211. The classification unit 211 classifies the terminal device as either a parent terminal or a child terminal according to whether the terminal device directly images the marker or indirectly images the marker.

For example, the classification unit 211 can classify the terminal device as either a parent terminal or a child terminal based on the marker presence position and the imaging position at which the terminal device images the marker. The marker presence position referenced herein is set, for example, in the marker information shown in FIG. 6, and the imaging position is contained in the classification request. For example, when the distance between the marker presence position and the imaging position is smaller than the predetermined threshold, the classification unit 211 may classify the terminal device as the parent terminal. This is because the terminal device is assumed to be directly imaging the marker.

Further, the predetermined threshold may be set in advance. Further, for example, when the distance between the presence position of the marker Mar1 imaged by the terminal device 10A and the imaging position is smaller than a predetermined threshold, the terminal device 10A is classified as a parent terminal by the classification unit 211. The predetermined threshold may be provided to be common to all markers or may be provided for each marker. For example, since the marker is assumed to be imaged from a distance as a size of the marker increases, the predetermined threshold may increase. When the predetermined threshold is provided for each marker, for example, the predetermined threshold may be provided in the marker information as shown in FIG. 6.

A condition for classifying the terminal devices 10 may be further detailed. For example, the classification unit 211 may classify the terminal device as either a parent terminal or a child terminal based also on the provision time when the marker in the real space is provided to the user and the imaging time when the terminal device images the marker. The provision time referenced herein is set, for example, in the marker information shown in FIG. 6 and the imaging time is contained in the classification request. The classification unit 211, for example, may classify the terminal device as the parent terminal when the imaging time is in the provision time. This is because the terminal device is assumed to directly image the marker.

When the classification unit 211 classifies the terminal device 10A as the parent terminal, the classification unit 211 may set the marker code Mark1 and the terminal ID for identifying the terminal device 10A in the parent-child relationship information as the marker code and the parent terminal ID. The parent-child relationship information is stored in, for example, the storage unit 220 of the information processing device 20. Further, the parent-child relationship information will be described later with reference to FIG. 10.

Further, in the above description, the number of parent terminals is not particularly limited, but the number of parent terminals may be limited. In this case, for example, when the number of terminal devices that are classified as the parent terminal as the terminal devices directly image the marker reaches a predetermined upper limit, the classification unit 211 may not classify the terminal device newly imaging the marker as the parent terminal.

When such a restriction is set, provision of the content for a parent terminal may not be performed in a step in which the number of terminal devices directly imaging the marker reaches the predetermined upper limit. Accordingly, for example, when a poster is imaged as the marker, the content may be provided to a user who separates a coupon attached to the poster, in exchange for the coupon. Further, when such a restriction is set, the content provider can control the content for a parent terminal to be provided only to a limited number of parent terminals, which can encourage users to get the content early.

Then, the content provision unit 212 provides the content to the terminal device transmitting the classification request. In this case, the content provision unit 212 may change the content to be provided to the terminal device according to whether the classification unit 211 classifies the terminal device as the parent terminal or the child terminal. For example, the content provision unit 212 can acquire the content ID for a parent terminal corresponding to the marker code from the marker information as shown in FIG. 6 and provide content identified by the content ID for a parent terminal to the terminal device.

For example, a size of the content for a parent terminal may be set to be greater than that of the content for a child terminal. For example, the content for the parent terminal is a trial image having a greater size, and the content for the child terminal is a trial image having a smaller size. As the size of the provided content is set in this manner, for example, a user of the terminal device classified as a child terminal is expected to approach a place in which the marker is present, in order to get content having a greater size. Thus, for example, the content provider may control the content to be provided to the terminal device according to a plan for distribution of content.

The content provision unit 212 of the information processing device 20 may provide, for example, content identified by the content ID "P001" for a parent terminal set in the marker information as shown in FIG. 6, to the terminal device 10A classified as the parent terminal. As in the example shown in FIG. 7, the content provision unit 212 may first provide a selection screen Sel1 for selecting a section of the content to the terminal device 10A. For example, when the content is a movie, the section may correspond to an episode. On the selection screen Sel1, the sections Se1, Se2, Se3, Se4, and Se9 of the entire content are selectable, and an indication that the sections Se5 to Se8 are selectable is shown.

Then, when the section is selected by the content acquisition unit 113 of the terminal device 10A, the content provision unit 212 may provide a play screen for start of play of the selected section to the terminal device 10A. The selection of the section may be performed, for example, based on a selection manipulation of the user given to the input unit 120. In the example shown in FIG. 7, the section Se5 is selected on the selection screen Sel1, and a play start screen Pl50 is provided to the terminal device 10A.

Then, when a play manipulation is detected by the content acquisition unit 113 of the terminal device 10A, the content provision unit 212 can start provision of the selected section to the terminal device 10A. The content acquisition unit 113 can detect, for example, the play manipulation of the user given to the input unit 120. In the example shown in FIG. 7, the play manipulation is detected on the play start screen Pl50 and the section Se5 is provided to the terminal device 10A. The provided section Se5 is displayed as the play screen Pl51.

The provision of the content to the parent terminal has been described above with reference to FIGS. 6 and 7. Hereinafter, the provision of the content to the child terminal will be described in detail with reference to FIGS. 8 to 12.

7. Provision of Content to Child Terminal

As described above, the classification unit 211 of the information processing device 20 classifies the terminal device as either the parent terminal or the child terminal according to whether the terminal device directly images a marker or indirectly images the marker. The classification unit 211 classifies the terminal device as the child terminal, for example, when a distance between the marker presence position and the imaging position is greater than a predetermined threshold. This is because the terminal device is assumed to indirectly image the marker. Further, the classification unit 211 may classify the terminal device as either the parent terminal or the child terminal, for example, when the distance between the marker presence position and the imaging position is the same.

Further, as described above, for example, the classification unit 211 may classify the terminal device as either the parent terminal or the child terminal based also on the provision time when the marker is provided to the user in the real space and the imaging time when the terminal device images the marker. For example, when the imaging time is outside the provision time, the classification unit 211 classifies the terminal device as the child terminal. This is because the terminal device is assumed to indirectly image the marker.

When the classification unit 211 classifies the terminal device as the child terminal, the classification unit 211 may specify a parent terminal (the terminal device displaying the marker directly imaged by the child terminal) for the child terminal. For example, when the classification unit 211 classifies the terminal device 10B as the child terminal, the classification unit 211 may specify a parent terminal for the terminal device 10B. Some schemes are assumed as a scheme for specifying the parent terminal for the child terminal. Among these schemes, the first to third schemes will be described in detail below.

The first scheme will be described. In this scheme, first, the communication unit 160 of the terminal device 10A classified as the parent terminal transmits a display position and a display time in which the captured image of the marker is displayed by the output unit 130 to the information processing device 20. A representation format of the display position may be a format using longitude (an X coordinate) and latitude (a Y coordinate), a format using polar coordinates, or a format using a vector. Further, the representation format of the presence position may be three-dimensional coordinates, including altitude. The display position and the display time may be transmitted to the information processing device 20 every predetermined time or may be transmitted to the information processing device 20 when the display of the captured image starts. Further, when a transmission manipulation of a user is given to the input unit 120, the display position and the display time may be transmitted to the information processing device 20.

Then, the communication unit 230 of the information processing device 20 receives the display position and the display time from the terminal device 10A. For example, when an imaging position at which the terminal device 10B images the marker and an imaging time in which the terminal device 10B images the marker is close to the display position and the display time received from the terminal device 10A, the classification unit 211 may determine that the terminal device 10A is the parent terminal of the terminal device 10B. For example, when a distance between the imaging position and the display position is smaller than a predetermined distance and when an interval between the imaging time and the display time is shorter than a predetermined time, the terminal device 10A may be determined as the parent terminal of the terminal device 10B.

Figure 8:
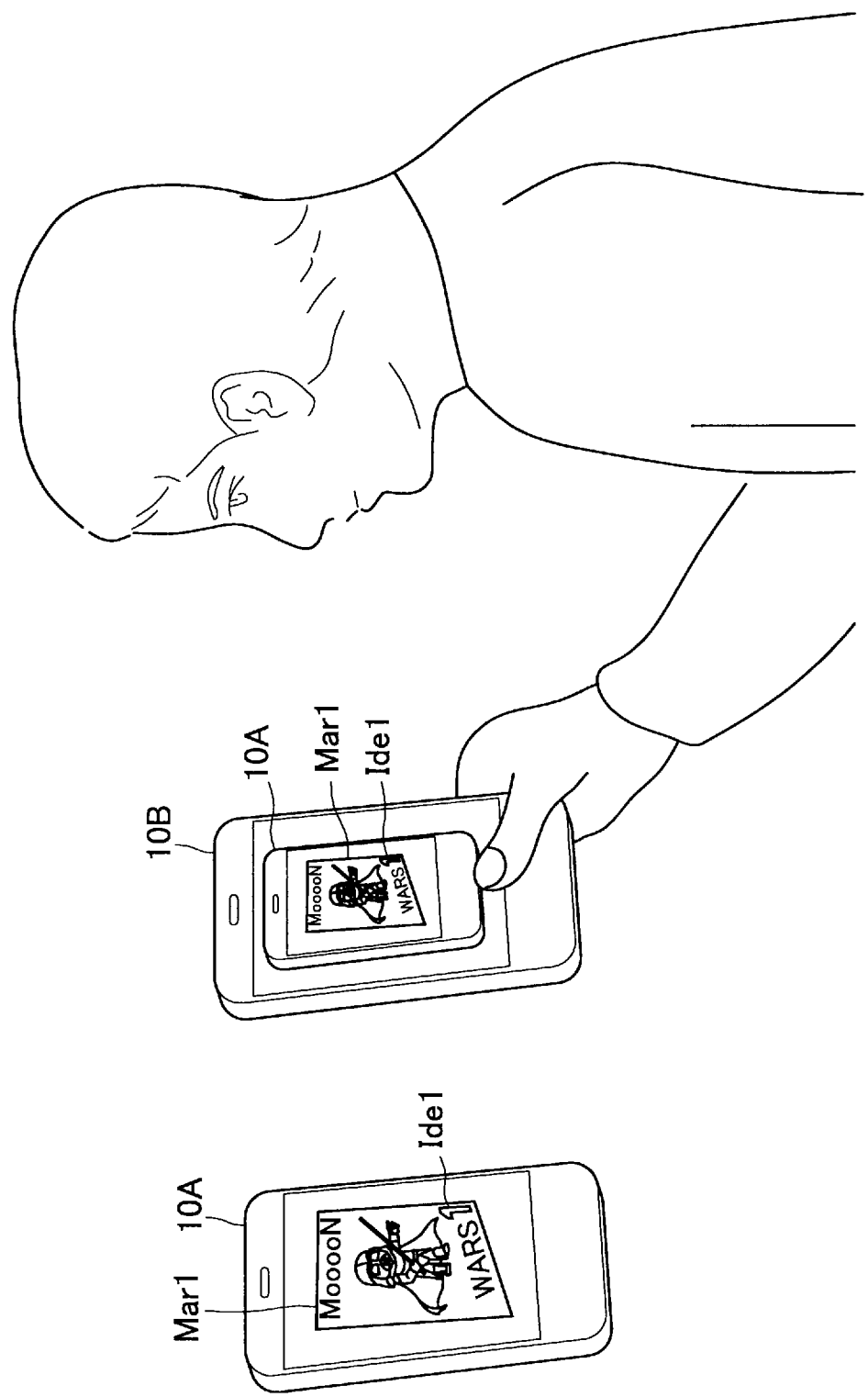
FIG. 8 is a diagram illustrating an example of a scheme for determining a parent terminal.

Next, the second scheme will be described with reference to FIG. 8. FIG. 8 is a diagram illustrating an example of a scheme for determining a parent terminal. In this scheme, when the captured image of the marker Mar1 is displayed on the output unit 130 of the terminal device 10A classified as the parent terminal, the control unit 110 adds identification information of the terminal device 10A to the captured image. In the example shown in FIG. 8, the identification information Ide1 "1" of the terminal device 10A is added to the captured image the marker Mar1 displayed by the terminal device 10A.

When the identification information of the terminal device 10A is recognized within the captured image, which is captured by the terminal device 10B, the classification unit 211 of the information processing device 20 may determine that the terminal device 10A is the parent terminal of the terminal device 10B. In the example shown in FIG. 8, since the identification information Ide1 "1" of the terminal device 10A is recognized within the captured image, which is captured by the terminal device 10B, the classification unit 211 may determine that the terminal device 10A is the parent terminal of the terminal device 10B.

Figure 9:
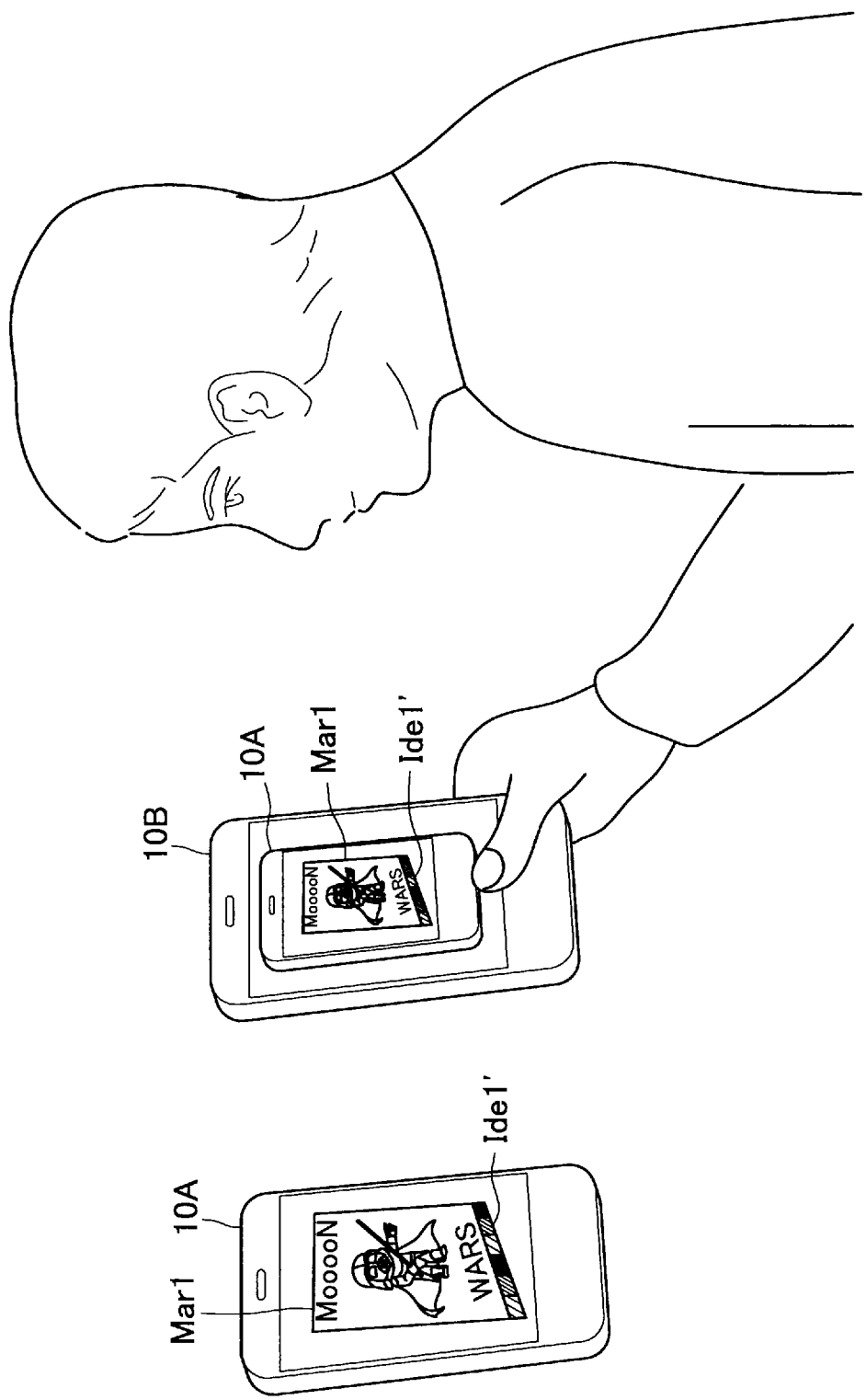
FIG. 9 is a diagram illustrating an example of a scheme for determining a parent terminal.

Next, the third scheme will be described with reference to FIG. 9. FIG. 9 is a diagram illustrating an example of a scheme for determining a parent terminal. Even in this scheme, when the captured image of the marker Mar1 is displayed on the output unit 130 of the terminal device 10A classified as the parent terminal, the control unit 110 adds the identification information of the terminal device 10A to the captured image, similar to the second scheme. In the example shown in FIG. 9, the identification information Ide1' of the terminal device 10A is added to the captured image of the marker Mar1 displayed by the terminal device 10A. The identification information Ide1' of the terminal device 10A may be embedded in the captured image using watermarking technology such as steganography.

When the identification information of the terminal device 10A is recognized within the captured image, which is captured by the terminal device 10B, the classification unit 211 of the information processing device 20 may determine that the terminal device 10A is the parent terminal of the terminal device 10B, similar to the second scheme. In the example shown in FIG. 9, since the identification information Ide1' of the terminal device 10A is recognized within the captured image, which is captured by the terminal device 10B, the classification unit 211 may determine that the terminal device 10A is the parent terminal of the terminal device 10B.

FIG. 10 is a diagram showing a configuration example of parent-child relationship information. When the terminal device 10A is determined to be the parent terminal of the terminal device 10B, the classification unit 211 may set the terminal ID of the terminal device 10A as the parent terminal ID and the terminal ID of the terminal device 10B as the child terminal ID in the parent-child relationship information. In FIG. 10, a state after the classification unit 211 sets the terminal ID of the terminal device 10A as parent terminal ID "T0001" and the terminal ID of the terminal device 10B as child terminal ID "T0002" in the parent-child relationship information is shown.

The content provision unit 212 of the information processing device 20, for example, may provide content identified by the content ID "C001" for a child terminal set in the marker information as shown in FIG. 6 to the terminal device 10B classified as the child terminal. Further, while the content provision unit 212, for example, may provide content identified by the content ID "P001" for a parent terminal set in the marker information as shown in FIG. 6 to the terminal device 10A classified as the parent terminal as described above, the content provided to the parent terminal may also be changed according to a situation.

For example, the content provision unit 212 may change the content provided to the terminal device 10A, which is classified as the parent terminal by the classification unit 211, according to the number of child terminals of the parent terminal. As the content provided to the parent terminal of the child terminal is changed according to the number of child terminals in this manner, for example, a content provider can control the content to be provided to the terminal device according to a plan for distribution of content. The number of child terminals referenced herein may be obtained, for example, by counting the number of child terminals set in the parent-child relationship information as shown in FIG. 10.

FIG. 11 is a diagram showing a configuration example of content restriction information. For example, the content provision unit 212 may decrease the restriction imposed on the content provided to the terminal device classified as the parent terminal as the number of child terminals increases. As the restriction imposed on the content is controlled in this manner, for example, the user of the terminal device classified as the parent terminal is expected to cause the other terminal device to indirectly image the marker and accordingly the content provider can encourage re-distribution of the content.

For example, the restriction may be imposed on the content according to the size of the content. More specifically, for example, the content provision unit 212 may decrease the restriction imposed on the content by increasing the size of the content. In the above example, the content provision unit 212 may decrease the restriction imposed on the content by increasing the number of selectable sections.

In FIG. 11, an example of the content restriction information in which the restriction imposed on the content is set to "strong" when the number of child terminals is "0," the restriction imposed on the content is set to "normal" when the number of child terminals is "1," and the restriction imposed on the content is set to "weak" when the number of child terminals is "2 or more" is shown. However, the content restriction information shown in FIG. 11 is only an example. The content provision unit 212 can control the restriction imposed on the content with reference to content restriction information as shown in FIG. 11. The content restriction information may be registered in, for example, the storage unit 220 from the other terminal connected to the network 30 by the content provider.

Further, in contrast to such control, as the number of child terminals increases, the content provision unit 212 can increase the restriction imposed on the content provided to the terminal device classified as the parent terminal. As the restriction imposed on the content is controlled in this manner, for example, the user of the terminal device classified as the parent terminal is expected to cause the other terminal device to indirectly image the marker, and the content provider can accordingly restrict the re-distribution of the content.

Further, for example, the restriction may be imposed on the content according to a condition other than the size of the content. For example, the restriction may be imposed on the content according to the remaining number of uses (e.g., the remaining number of plays of the content). More specifically, for example, the content provision unit 212 may decrease the restriction imposed on the content by increasing the remaining number of uses of the content. Further, in contrast to such control, the content provision unit 212 can increase the restriction imposed on the content by decreasing the remaining number of uses of the content.

For example, the content provision unit 212 may hold usage information in which the remaining number of uses is associated with the content and the parent terminal and acquire the remaining number of uses from the usage information. For example, when there is a parent terminal for which the remaining number of uses of the content is "0," the content provision unit 212 may control the content not to be provided to the parent terminal.

Further, the content provision unit 212 may hold usage information in which the remaining number of uses of the child terminal is associated with the content and the child terminal. For example, when there is a child terminal for which the remaining number of uses of the content is "0," the content provision unit 212 may control the content not to be provided to the child terminal. Further, the content provision unit 212 may hold a total remaining number of uses of a plurality of child terminals which have the same terminal device as the parent terminal.

For example, the restriction may be imposed on the content according to selectable sections. More specifically, for example, the content provision unit 212 may decrease the restriction imposed on the content by increasing the number of selectable sections. Further, in contrast to such control, the content provision unit 212 can increase the restriction imposed on the content by decreasing the number of selectable sections.

For example, when the content is provided to the parent terminal, the content provision unit 212 allows all of a plurality of sections that can be provided to be selectable. Further, the content provision unit 212 may hold a situation of the section provision to the parent terminal, and may control the sections already provided to the parent terminal among the plurality of sections that can be provided not to be provided to the child terminal when the content is provided to the child terminal. When such control is performed, the sections already provided to the parent terminal may not be selectable on the selection screen displayed by the child terminal.

Further, for example, the restriction may be imposed on the content according to a type of an object appearing in the content (e.g., a person or things appearing in the content). More specifically, for example, the content provision unit 212 may decrease the restriction imposed on the content by increasing the number of objects appearing in the content. Further, in contrast to such control, the content provision unit 212 can increase the restriction imposed on the content by decreasing the number of objects appearing in the content.

Figure 12:
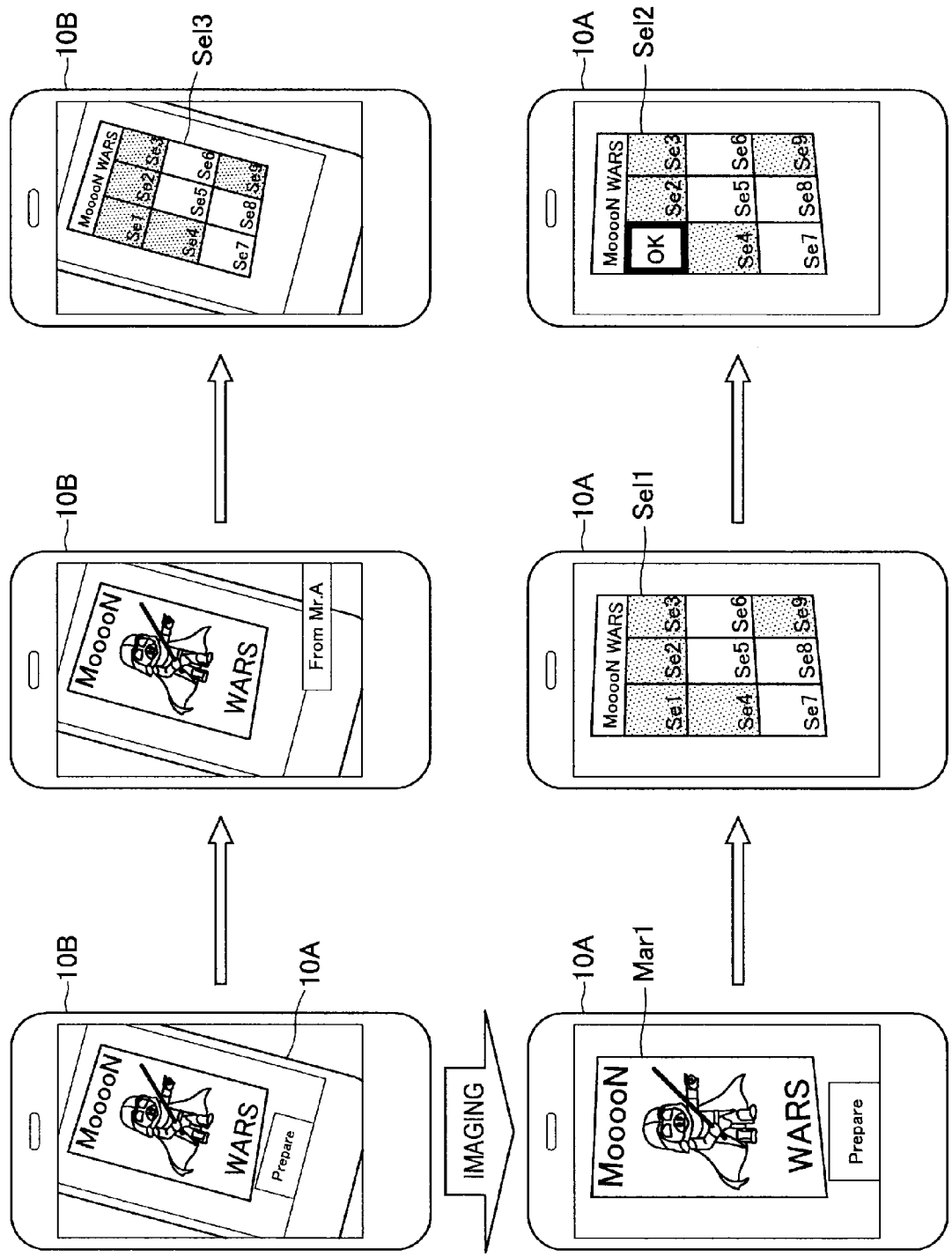
FIG. 12 is a diagram showing a state of provision of content to a child terminal.

FIG. 12 is a diagram showing a state of provision of content to the child terminal. a process in which the terminal device 10B is classified as the child terminal of the terminal device 10A and a process in which content is provided to the terminal device 10B classified as the child terminal will be described with reference to FIG. 12.

First, as shown in FIG. 12, the output unit 130 of the terminal device 10A may display the captured image obtained by imaging the marker Mar1 using the imaging unit 150. For example, a message "Prepare" may be added to the displayed captured image. For example, when a manipulation is given from the user to the input unit 120 to select "Prepare," the display position and display time may be transmitted to the information processing device 20. When the imaging unit 150 of the terminal device 10B images the displayed captured image, the recognition unit 111 recognizes the marker code from the marker contained in the captured image. For example, in the example shown in FIG. 2, the imaging unit 150 images the marker Mar1 and the recognition unit 111 recognizes the marker code Mark1 from the marker Mar1 contained in the captured image. Further, the recognition unit 111 can also recognize the position and the posture of the marker contained in the captured image.

The marker code recognized by the recognition unit 111 is controlled to be transmitted as a classification request to the information processing device 20 via the network 30 by the classification request unit 112. For example, the terminal ID for identifying the terminal device 10B, the imaging time that is a time when the marker is imaged, and the imaging position indicating a position at which the marker is imaged may also be contained in the classification request. A representation format of the imaging position is not particularly limited, similar to the presence position set in the marker information. Further, for example, when a selection manipulation for selecting the marker Mar1 is input to the input unit 120, the classification request unit 112 may perform control to transmit a classification request.

The communication unit 160 transmits the classification request to the information processing device 20 via the network 30 under control of the classification request unit 112. The classification request transmitted by the communication unit 160 is received by the communication unit 230 of the information processing device 20 and acquired by the classification unit 211. For example, when a distance between the marker presence position and the imaging position is greater than a predetermined threshold, the classification unit 211 classifies the terminal device 10B as a child terminal. When the classification unit 211 classifies the terminal device 10B as the child terminal, the classification unit 211 specifies a parent terminal for the terminal device 10B.

For example, the classification unit 211 specifies the terminal device 10A as the parent terminal for the terminal device 10B using the above-described scheme. When the terminal device 10A is determined to be the parent terminal of the terminal device 10B, the classification unit 211 may set the terminal ID of the terminal device 10A as the parent terminal ID and the terminal ID of the terminal device 10B as the child terminal ID in the parent-child relationship information. Further, the terminal device 10B may be notified of the parent terminal specified by the classification unit 211. In the example shown in FIG. 12, the terminal device 10B is notified of user name "A" of the terminal device 10A specified as the parent terminal, and the output unit 130 of the terminal device 10B displays the user of the parent terminal as "From Mr. A" based on the notified user name "A."

The content provision unit 212 of the information processing device 20 may provide, for example, content identified by the content ID "C001" for a child terminal set in the marker information as shown in FIG. 6, to the terminal device 10B classified as the child terminal. Meanwhile, as described above, the content provision unit 212 may provide, for example, content identified by the content ID "P001" for a parent terminal set in the marker information as shown in FIG. 6, to the terminal device 10A classified as the parent terminal. The content for child terminal and the content for a parent terminal, for example, have different sizes.

As in the example shown in FIG. 12, the content provision unit 212 may provide a selection screen Sel3 for selection of the section of the content for the child terminal to the terminal device 10B. Meanwhile, the content provision unit 212 provides a selection screen Sel1 for selection of the section of the content for the parent terminal to the terminal device 10A, but the restriction imposed on the content can be changed since the number of child terminals of the terminal device 10A increases if the terminal device 10B is classified as the child terminal of the terminal device A. As shown in FIG. 12, for example, the content provision unit 212 decreases the restriction imposed on the content provided to the terminal device 10A and provides the selection screen Sel2 in which a section Se1 is newly selectable to the terminal device 10A. For example, as shown in FIG. 12, the section Set that becomes newly selectable may be highlighted (e.g., by a highlighting display such as an "OK" mark).

Further, as described above, when the terminal device 10B is classified as the child terminal, the content provision unit 212 may change the restriction imposed on the content provided to the terminal device 10A that is the parent terminal, but a timing when the restriction imposed on the content is changed is not limited. For example, when the content provision unit 212 provides the content to the terminal device 10B classified as the child terminal, the content provision unit 212 may change the restriction imposed on the content provided to the terminal device 10A that is the parent terminal.

The provision of the content to the child terminal has been described above with reference to FIGS. 8 to 12. Hereinafter, a flow of the classification operation in the information processing device 20 will be described in detail with reference to FIG. 13.

8. Classification Operation in Information Processing Device

Figure 13:
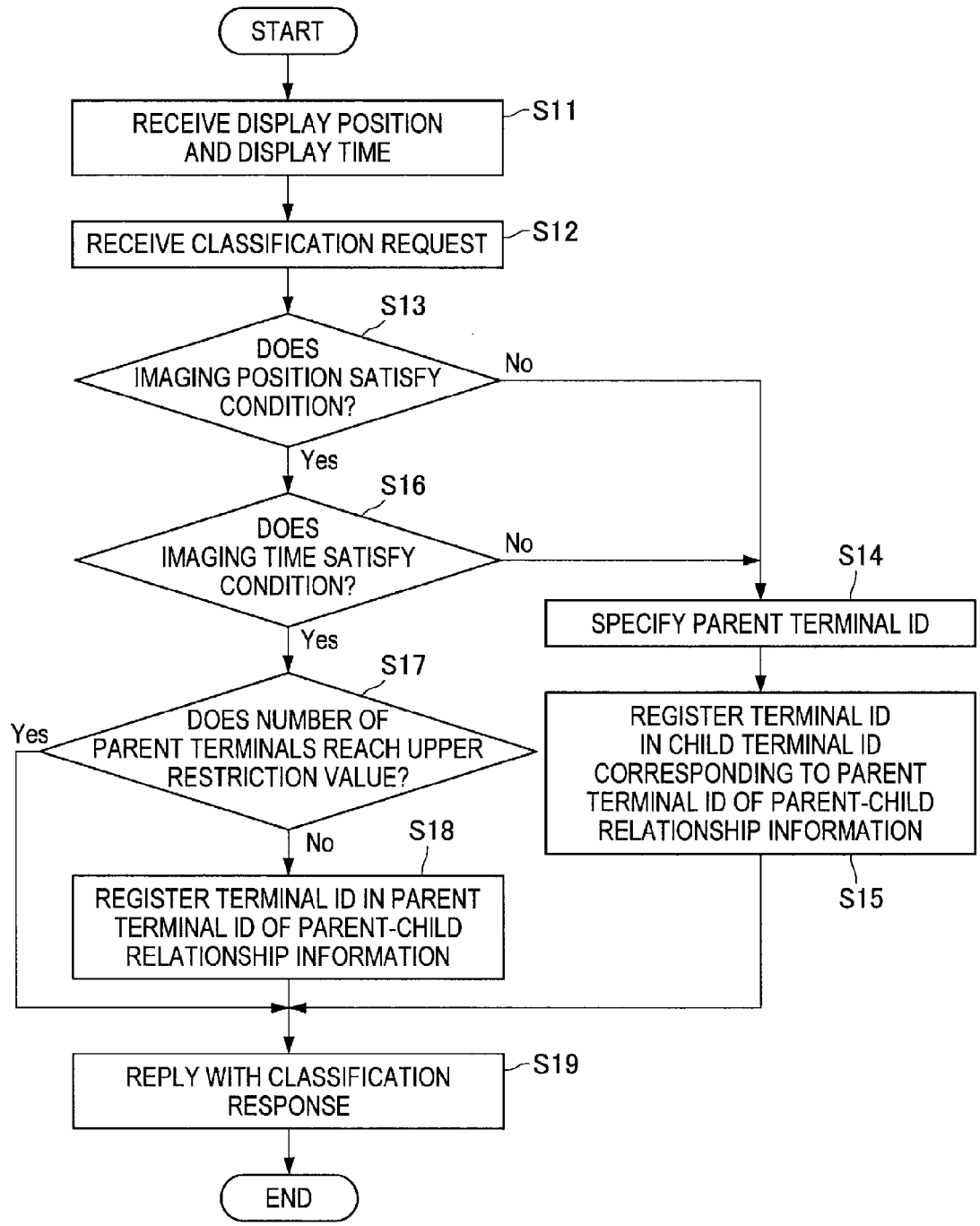
FIG. 13 is a flowchart showing a flow of a classification operation in an information processing device.

FIG. 13 is a flowchart showing a flow of the classification operation in the information processing device 20. First, when the parent terminal transmits the display position and the display time, the communication unit 230 of the information processing device 20 receives the display position and the display time transmitted by the parent terminal (step S11), as shown in FIG. 13.

Further, when the terminal device 10 transmits the classification request, the communication unit 230 of the information processing device 20 receives the classification request transmitted by the terminal device 10 (step S12). For example, when a selection manipulation is input to select a marker, a classification request is transmitted as described above. The marker code recognized by the terminal device 10, the terminal ID of the terminal device 10, the imaging time of the marker, and the imaging position of the marker are contained in the classification request. The classification request received by the communication unit 230 is acquired by the classification unit 211.

Then, the classification unit 211 determines whether the imaging position satisfies a condition (step S13). The condition corresponds to, for example, a condition that a distance between the marker presence position and the imaging position be smaller than a predetermined threshold, as described above. When the imaging position satisfies the condition ("Yes" in step S13), the classification unit 211 further determines whether the imaging time satisfies a condition (step S16). This condition corresponds to, for example, a condition that the imaging time be in the provision time, as described above.

When the imaging time satisfies the condition ("Yes" in step S16), the classification unit 211 determines whether the number of parent terminals reaches an upper restriction (step S17). When the number of parent terminals reaches the upper restriction ("Yes" in step S17), the classification unit 211 proceeds to step S19. On the other hand, when the number of parent terminals does not reach the upper restriction value ("No" in step S17), the classification unit 211 determines that the terminal device 10 transmitting the classification request is the parent terminal and proceeds to step S18.

When the classification unit 211 determines that the terminal device 10 transmitting the classification request is the parent terminal, the classification unit 211 registers the terminal ID contained in the classification request in the parent terminal ID of the parent-child relationship information (step S18) and proceeds to step S19.

On the other hand, when the imaging position does not satisfy the condition ("No" in step S13), or when the imaging time does not satisfy the condition ("No" in step S16), the classification unit 211 determines that the terminal device 10 transmitting the classification request is the child terminal. When the classification unit 211 determines that the terminal device 10 transmitting the classification request is the child terminal, the classification unit 211 specifies the parent terminal ID of the terminal device 10 (step S14), registers the terminal ID contained in the classification request in the child terminal ID corresponding to the parent terminal ID of the parent-child relationship information (step S15), and proceeds to step S19.

In step S19, the classification unit 211 replies with a classification response (step S19), and ends the classification operation. A selection screen for selection of the content (e.g., a selection screen for selection of a section of the content) may be contained in the classification response. In this case, the terminal device 10 may display the selection screen contained in the classification response. Further, information indicating that the number of parent terminals reaches the upper restriction may be contained in the classification response.

The flow of the classification operation in the information processing device 20 has been described above with reference to FIG. 13. Hereinafter, a flow of the content provision operation in the information processing device 20 will be described in detail with reference to FIG. 14.

9. Content Provision Operation in Information Processing Device

Figure 14:
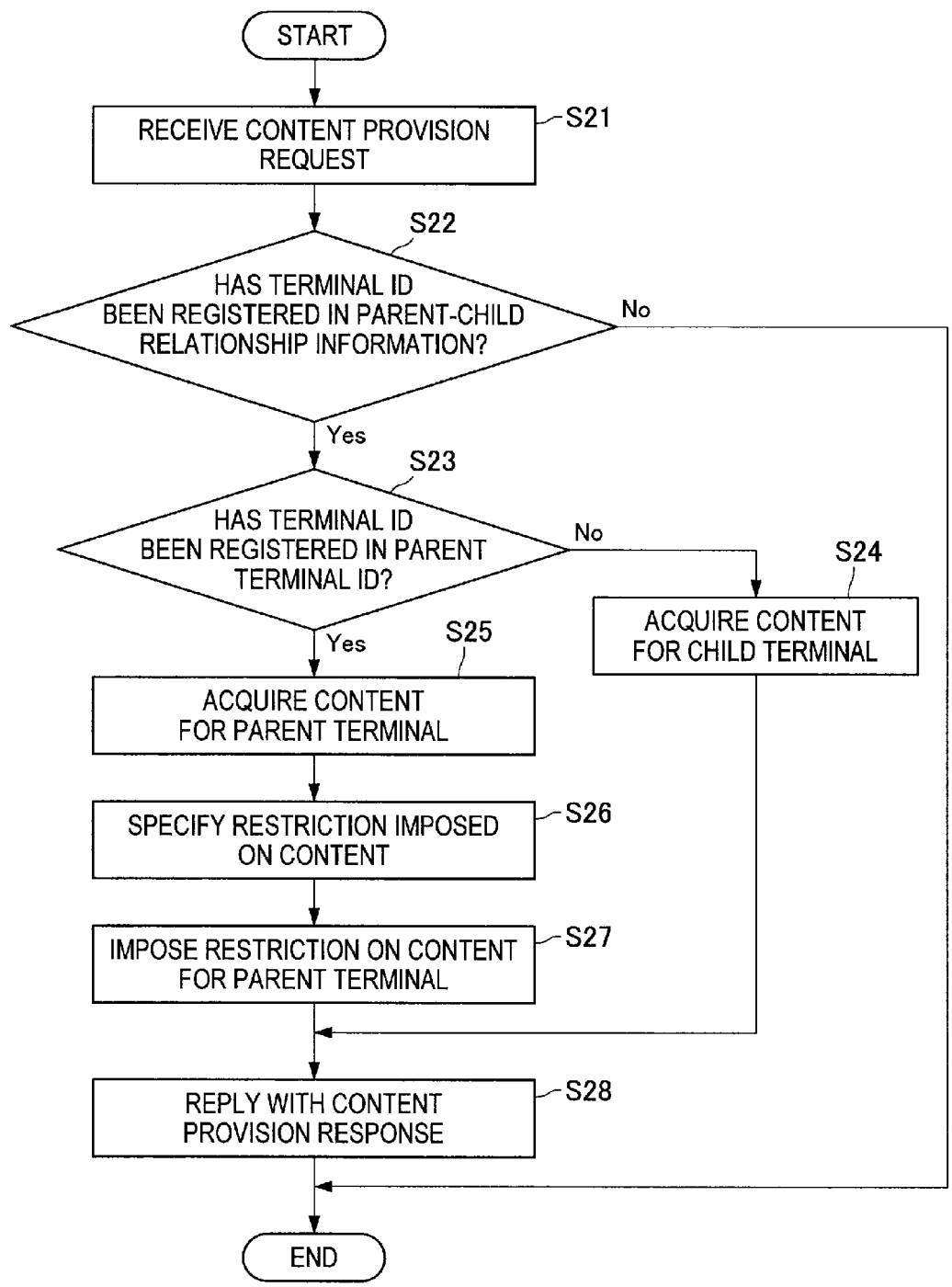
FIG. 14 is a flowchart showing a flow of a content provision operation in an information processing device.

FIG. 14 is a flowchart showing a flow of the content provision operation in the information processing device 20. As shown in FIG. 14, first, when the terminal device 10 transmits a content provision request, the communication unit 230 of the information processing device 20 receives the content provision request transmitted by the terminal device 10 (step S21). For example, when a selection manipulation is input to select content, the content provision request is transmitted. The terminal ID of the terminal device 10 is contained in the content provision request. The content provision request received by the communication unit 230 is acquired by the content provision unit 212.

Then, the content provision unit 212 determines whether the terminal ID contained in the content provision request has been registered in the parent-child relationship information (the parent terminal ID or the child terminal ID of the parent-child relationship information) (step S22). If the terminal ID contained in the content provision request has not been registered in the parent-child relationship information (the parent terminal ID or the child terminal ID of the parent-child relationship information) ("No" in step S22), the content provision unit 212 ends the content provision operation. If the terminal ID contained in the content provision request has been registered in the parent-child relationship information ("Yes" in step S22), the content provision unit 212 determines whether the terminal ID contained in the content provision request has been registered in the parent terminal ID of the parent-child relationship information (step S23).

When the terminal ID contained in the content provision request has not been registered in the parent terminal ID of the parent-child relationship information (i.e., when the terminal ID contained in the content provision request is registered in the child terminal ID of the parent-child relationship information) ("No" in step S23), the content provision unit 212 determines that the terminal device 10 transmitting the content provision request is the child terminal. When the terminal device 10 transmitting the content provision request is determined as the child terminal, the content provision unit 212 acquires content for a child terminal (step S24) and proceeds to step S28.

When the terminal ID contained in the content provision request has been registered in the parent terminal ID of the parent-child relationship information ("Yes" in step S23), the content provision unit 212 determines that the terminal device 10 transmitting the content provision request is the parent terminal. When the content provision unit 212 determines that the terminal device 10 transmitting the content provision request is the parent terminal, the content provision unit 212 acquires content for a parent terminal (step S25). Then, the content provision unit 212 specifies the restriction imposed on the content, imposes a restriction on the content for a parent terminal based on the specified restriction (step S27), and proceeds to step S28.

In step S28, the content provision unit 212 replies with a content provision response (step S28) and ends the content provision operation. The content is contained in the content provision response. The terminal device 10 may provide the content contained in the content provision response to the user.

The flow of the content provision operation in the information processing device 20 has been described above with reference to FIG. 14.

10. Conclusion

As described above, the information processing device 20 according to the present disclosure includes the content provision unit that provides the content associated with the object to the terminal device 10 imaging the object present in the real space. Further, the information processing device 20 includes the classification unit that classifies the terminal device 10 as either the parent terminal or the child terminal according to whether the terminal device 10 directly images the object or indirectly images the object. Accordingly, it is possible to distinguish between the terminal device that directly images an object and the terminal device that indirectly images the object.

Further, as the classification function of the information processing device 20 according to an embodiment of the present disclosure is prepared for a plurality of terminal devices, each of the plurality of terminal devices is classified as either the parent terminal or the child terminal. For example, when the first terminal device classified as either the parent terminal or the child terminal is classified as the parent terminal and the second terminal device is classified as the child terminal, the parent-child relationship between the first terminal device and the second terminal device is built. As the building of such parent-child relationships progresses, parent-child relationships having a tree structure can be built.

It should be understood by those skilled in the art that various modifications, combinations, sub-combinations and alterations may occur depending on design requirements and other factors insofar as they are within the scope of the appended claims or the equivalents thereof.

While, for example, the example in which the terminal device 10 has the object recognition function has been mainly described above, a server rather than the terminal device 10 may have such a function. For example, when the terminal device 10 transmits the captured image to the server, the server may recognize a screen from the captured image instead of the terminal device 10. Thus, the technology of the present disclosure may also be applied to cloud computing.

Further, it is unnecessary for the respective steps in the operation of the information processing device 20 in this disclosure to be processed sequentially in the order described in the flowchart. For example, the respective steps in the operation of the information processing device 20 may be processed in a different order from the order described in the flowchart or may be processed in parallel.

Further, a computer program that causes hardware such as a CPU, a ROM and a RAM embedded in the terminal device 10 or the information processing device 20 to have the same function as each configuration of the terminal device 10 or the information processing device 20 described above can be created. Further, a storage medium that stores the computer program is also provided.

Additionally, the present technology may also be configured as below.

(1) An information processing system comprising: one or more processing units that acquire image data corresponding to an object; acquire content based on a determination of whether the image data is direct image data that is directly acquired or indirect image data that is indirectly acquired; and output the acquired content.

(2) The information processing system of (1), wherein the object is at least one of a real object, a part of a real object, a figure, a symbol, a character string, an image disposed on a surface of a real object and an image displayed on a display.

(3) The information processing system of any of (1) to (2), wherein the acquired content is at least one of still image content, moving image content, sound data, video and audio data and text data.

(4) The information processing system of any of (1) to (3), wherein the one or more processing units control a display to display the acquired content superimposed on the image data.

(5) The information processing system of any of (1) to (4), wherein the one or more processing units acquire a code extracted from the image data that corresponds to the object.

(6) The information processing system of (5), wherein the one or more processing units acquire the content based on the code and the determination of whether the image data is direct image data or indirect image data.

(7) The information processing system of any of (1) to (6), wherein the one or more processing units acquire time information indicating at least one of a time at which the image data was captured and a time at which the object was available to be captured.

(8) The information processing system of (7), wherein the one or more processing units acquire the content based on the time information and the determination of whether the image data is direct image data or indirect image data.

(9) The information processing system of any of (1) to (8), wherein the one or more processing units acquire position information indicating at least one of a position of the object and a position of a device that captured the image data.

(10) The information processing system of (9), wherein the one or more processing units acquire the content based on the position information and the determination of whether the image data is direct image data or indirect image data.

(11) The information processing system of any of (1) to (10), wherein the one or more processing units acquire device identification information corresponding to a device that captured the image data.

(12) The information processing system of (11), wherein the one or more processing units acquire the content based on the device identification information and the determination of whether the image data is direct image data or indirect image data.

(13) The information processing system of any of (1) to (12), wherein the object included in the image data includes at least a portion of a digital sign, and the one or more processing units acquire the content based on content of the at least a portion of the digital sign and the determination of whether the image data is direct image data or indirect image data.

(14) The information processing system of any of (1) to (13), wherein the one or more processing units recognize the object included in the image data by performing an image recognition process on the acquired image data.

(15) The information processing system of (14), wherein the one or more processing units acquire the content based on a result of the image recognition process and the determination of whether the image data is direct image data or indirect image data.

(16) The information processing system of any of (1) to (15), wherein the one or more processing units acquire first position information indicating a position of the object and second position information indicating a position of a device that captured the image data; compare a difference between the first position information and the second position information to a predetermined threshold value; classify the device as a parent device when the difference is less than the predetermined threshold value and classify the device as a child terminal when the difference is greater than the predetermined threshold value; and acquire the content based on the classification of the device.

(17) The information processing system of any of (1) to (16), wherein the one or more processing units acquire first time information indicating a time during which the object was visible to be imaged and second time information indicating a time at which the image data was captured; determine whether the second time information coincides with the first time information; classify the device as a parent device when the second time information coincides with the first time information and classify the device as a child device when the second time information does not coincide with the first time information; and acquire the content based on the classification of the device.

(18) The information processing system of any of (1) to (17), wherein the object corresponds to a poster including coupon information, and the one or more processing units acquire content corresponding to the coupon information and based on based on the determination of whether the image data is direct image data or indirect image data.

(19) The information processing system of (18), further comprising: a memory that stores an upper threshold corresponding to a number of times the acquired content corresponding to the coupon information may be output, wherein the one or more processing units control a number of times the acquired content corresponding to the coupon information may be output based on the upper threshold.

(20) The information processing system of any of (1) to (19), further comprising: a user interface that displays the acquired image data and receives a user input selecting the object from the acquired image data.

(21) The information processing system of any of (1) to (20), further comprising: a first information processing apparatus comprising an image capturing unit that captures the image data corresponding to the object; and a first communication interface that outputs the image data to a second information processing apparatus; and the second information processing apparatus comprising a second communication interface that receives the image data from the first information processing apparatus; and a processing unit that acquires the image data corresponding to the object; acquire content based on a determination of whether the image data is direct image data that is directly acquired or indirect image data that is indirectly acquired; and controls the second communication interface to output the acquired content to the first information processing apparatus.

(22) The information processing system of any of (1) to (20), wherein the information processing system is a terminal including the one or more processing units.

(23) The information processing system of any of (1) to (20), wherein the one or more processing units acquire different content based on the determination of whether the image data is direct image data that is directly acquired or indirect image data that is indirectly acquired.

(24) An information processing method performed by an information processing system, the method comprising: acquiring, by one or more processing units of the information processing system, image data corresponding to an object; acquiring, by one or more processing units of the information processing system, content based on a determination of whether the image data is direct image data that is directly acquired or indirect image data that is indirectly acquired; and outputting the acquired content.

(25) A non-transitory computer-readable medium including computer program instructions, which when executed by an information processing system, cause the information processing system to perform a process comprising: acquiring image data corresponding to an object; acquiring content based on a determination of whether the image data is direct image data that is directly acquired or indirect image data that is indirectly acquired; and outputting the acquired content.

REFERENCE SIGNS LIST

1 Information processing system
10 (10A, 10B) Terminal device
20 Information processing device
30 Network
110 Control unit
111 Recognition unit
112 Classification request unit
113 Content acquisition unit
120 Input unit
130 Output unit
140 Storage unit
150 Imaging unit
160 Communication unit
210 Control unit
211 Classification unit
212 Content provision unit
220 Storage unit
230 Communication unit

The invention claimed is:

1. An information processing system comprising:
processor configured to:
acquire image data corresponding to an object;
acquire content based on a determination of whether the image data is direct image data that is directly acquired or indirect image data that is indirectly acquired; and
output the acquired content,
wherein whether the image data is said direct image data that is directly acquired or said indirect image data that is indirectly acquired is determined based on whether a difference between a position of the object and a position of a device that captures the image data is less than a predetermined threshold value.

2. The information processing system of claim 1, wherein the object is at least one of a real object, a part of the real object, a figure, a symbol, a character string, an image disposed on a surface of the real object, and an image displayed on a display.

3. The information processing system of claim 1, wherein the acquired content is at least one of still image content, moving image content, sound data, video and audio data, and text data.

4. The information processing system of claim 1, wherein the processor is configured to control a display to display the acquired content superimposed on the image data.

5. The information processing system of claim 1, wherein the processor is configured to acquire a code extracted from the image data that corresponds to the object.

6. The information processing system of claim 5, wherein the processor is configured to acquire the content based on the code and the determination of whether the image data is said direct image data or said indirect image data.

7. The information processing system of claim 1, wherein the processor is configured to acquire time information indicating at least one of a time at which the image data was captured and a time at which the object was available to be captured.

8. The information processing system of claim 7, wherein the processor is configured to acquire the content based on the time information and the determination of whether the image data is said direct image data or said indirect image data.

9. The information processing system of claim 1, wherein the processor is configured to acquire position information indicating the position of the object and the position of the device that captures the image data.

10. The information processing system of claim 9, wherein the processor is configured to acquire the content based on the position information and the determination of whether the image data is said direct image data or said indirect image data.

11. The information processing system of claim 1, wherein the processor is configured to acquire device identification information corresponding to the device that captures the image data.

12. The information processing system of claim 11, wherein
the processor is configured to acquire the content based on the device identification information and the determination of whether the image data is said direct image data or said indirect image data.

13. The information processing system of claim 1, wherein the object included in the image data includes at least a portion of a digital sign, and the processor is configured to acquire the content based on content of the portion of the digital sign and the determination of whether the image data is said direct image data or said indirect image data.

14. The information processing system of claim 1, wherein the processor is configured to recognize the object included in the image data by performing an image recognition process on the acquired image data.

15. The information processing system of claim 14, wherein
the processor is configured to acquire the content based on a result of the image recognition process and the determination of whether the image data is said direct image data or said indirect image data.

16. The information processing system of claim 1, wherein the processor is configured to:
acquire first position information indicating the position of the object and second position information indicating the position of the device that captures the image data;
compare the difference between the first position information and the second position information to the predetermined threshold value;
classify the device as a parent device when the difference is less than the predetermined threshold value and classify the device as a child terminal when the difference is greater than the predetermined threshold value; and
acquire the content based on the classification of the device.

17. The information processing system of claim 1, wherein the processor is configured to:
acquire first time information indicating a time during which the object was visible to be imaged and second time information indicating a time at which the image data was captured;
determine whether the second time information coincides with the first time information;
classify the device as a parent device when the second time information coincides with the first time information and classify the device as a child device when the second time information does not coincide with the first time information; and
acquire the content based on the classification of the device.

18. The information processing system of claim 1, wherein the object corresponds to a poster including coupon information, and the processor is configured to acquire content corresponding to the coupon information based on the determination of whether the image data is said direct image data or said indirect image data.

19. The information processing system of claim 18, further comprising:
a memory that stores an upper threshold corresponding to a number of times the acquired content corresponding to the coupon information may be output, wherein
the processor is configured to control the number of times the acquired content corresponding to the coupon information may be output based on the upper threshold.

20. The information processing system of claim 1, further comprising:
a user interface that displays the acquired image data and receives a user input for selecting the object from the acquired image data.

21. The information processing system of claim 1, further comprising:
a first information processing apparatus comprising:
the device that captures the image data corresponding to the object; and
a first communication interface that outputs the image data to a second information processing apparatus; and
the second information processing apparatus comprising:
a second communication interface that receives the image data from the first information processing apparatus; and
the processor configured to:
acquire the image data corresponding to the object;
acquire the content based on the determination of whether the image data is said direct image data that is directly acquired or said indirect image data that is indirectly acquired; and
control the second communication interface to output the acquired content to the first information processing apparatus.

22. The information processing system of claim 1, wherein the information processing system is a terminal including the processor.

23. The information processing system of claim 1, wherein the processor is configured to acquire different content based on the determination of whether the image data is said direct image data that is directly acquired or said indirect image data that is indirectly acquired.

24. An information processing method performed by an information processing system, the method comprising:
acquiring, by processor of the information processing system, image data corresponding to an object,
acquiring, by the processor of the information processing system, content based on a determination of whether the image data is direct image data that is directly acquired or indirect image data that is indirectly acquired; and
outputting the acquired content,
wherein whether the image data is said direct image data that is directly acquired or said indirect image data that is indirectly acquired is determined based on whether a difference between a position of the object and a position of a device that captures the image data is less than a predetermined threshold value.

25. A non-transitory computer-readable medium including computer program instructions, which when executed by an information processing system, cause the information processing system to perform a process comprising:
acquiring image data corresponding to an object;
acquiring content based on a determination of whether the image data is direct image data that is directly acquired or indirect image data that is indirectly acquired; and
outputting the acquired content,
wherein whether the image data is said direct image data that is directly acquired or said indirect image data that is indirectly acquired is determined based on whether a difference between a position of the object and a position of a device that captures the image data is less than a predetermined threshold value.

* * * * *